April 14, 1964     F. E. ADAMSON ETAL     3,129,352
ARC WELDING POWER SUPPLY

Filed Aug. 27, 1958     2 Sheets-Sheet 1

WITNESSES

INVENTORS
Floyd E. Adamson &
Martin Rebuffoni
BY
ATTORNEY

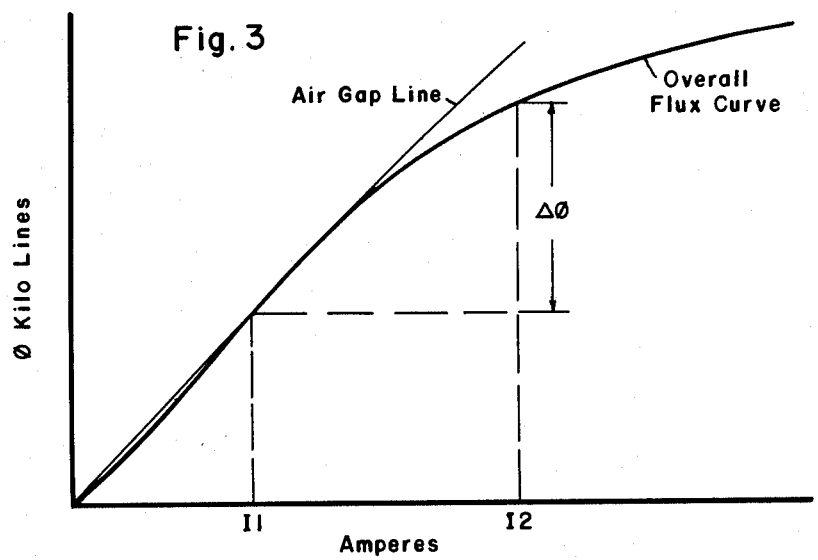
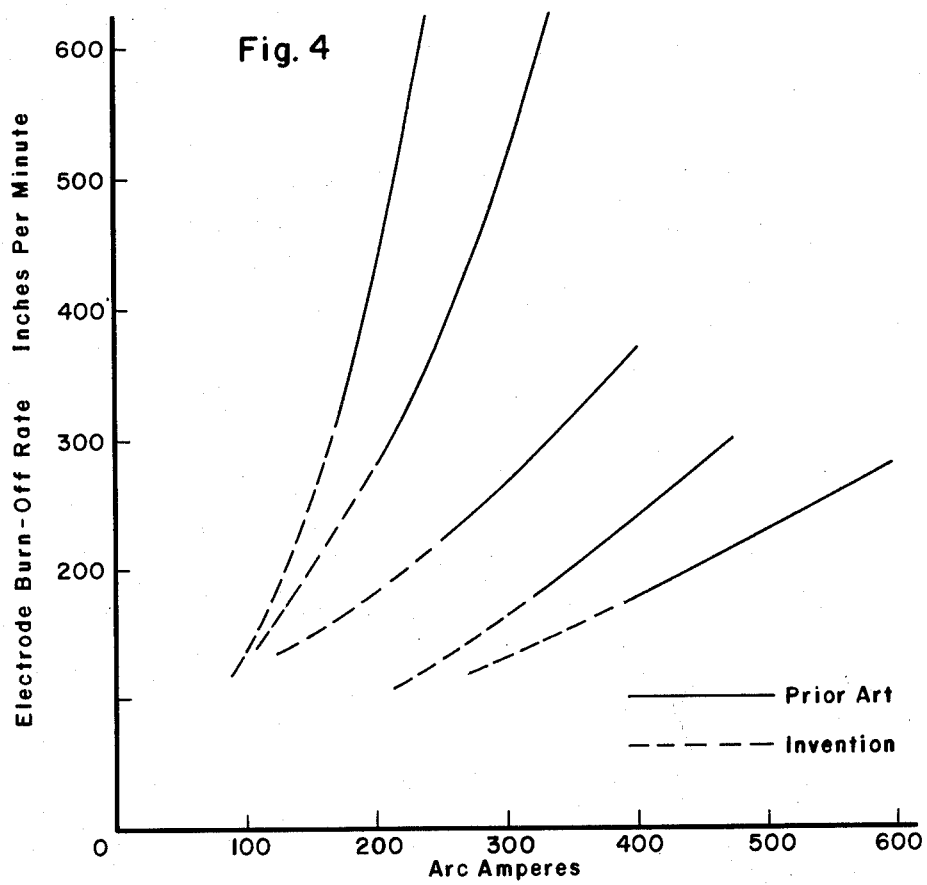

United States Patent Office 3,129,352
Patented Apr. 14, 1964

3,129,352
ARC WELDING POWER SUPPLY
Floyd E. Adamson, Kenmore, and Martin Rebuffoni, Williamsville, N.Y., assignors to Westinghouse Electric Corporation, East Pittsburgh, Pa., a corporation of Pennsylvania
Filed Aug. 27, 1958, Ser. No. 757,513
5 Claims. (Cl. 314—75)

This invention relates to the arc welding art, and has particular relationship to the welding of thin-gauge material. The expression "thin-gauge materials" as used in this specification means materials having a thickness up to about ⅛ inch. Usually such materials may have a thickness of the order of about .025 to .100 inch. In its specific aspects this invention concerns itself with the welding of the thin-gauge materials of iron base alloys such as mild and stainless steel and aluminum.

Difficulty has been encountered in welding these materials in accordance with the teachings of the prior art. In attempting to weld such materials, it has been found that the arc burns through the material. Thus it has been found impossible to butt weld mild steel plates of .047 inch thickness without burning through the plates. To reduce the burning through, backup may be used but this is unsatisfactory for other reasons.

It is accordingly broadly an object of this invention to provide apparatus for welding thin-gauge materials without backup at the point where the weld is produced.

It is a specific object of this invention to provide apparatus for welding thin-gauge materials and particularly materials composed of mild and stainless steel.

This invention in its broader aspect arises from the realization that the burn through is produced by the penetration of the arc and this, in turn, is caused by the high arc currents which are conducted in welding in accordance with the teachings of the prior art. Thus in welding, in accordance with the teachings of the prior art with a consumable mild steel bare electrode of .040 inch diameter in a shield of carbon dioxide it has been found that the arc current must be at least 220 amperes. Similarly in welding with a similar electrode of 1/16 inch diameter it was wound that the arc current must be at least 350 amperes. The experience was similar in the welding of mild and stainless steel in a mixture of pure argon and up to 5% oxygen by volume and in the welding of aluminum in pure argon. Attempts to reduce the welding arc current substantially resulted in such severe spatter as to prevent any reasonably satisfactory operation. It is then a specific object of this invention to provide apparatus particularly suitable for welding thin-gauge materials which shall operate at reasonably low welding currents without producing appreciable spatter.

Another object of this invention is to provide apparatus for welding thin-gauge materials which shall produce satisfactory welds at relatively low welding currents without excessive spatter.

An incidental object of this invention is to provide novel welding apparatus which, while particularly suitable for welding thin-gauge materials, is highly useful in the welding of materials of all types.

Another incidental object of this invention is to provide welding apparatus which shall lend itself with facility to overhead and vertical welding particularly with a consumable electrode in a shield of gas.

In the welding of thin-gauge materials particularly of mild and stainless steel and aluminum the practice has been to use a power-supply unit of the so-called constant-potential type to supply the welding current. Such a unit has a relatively low impedance; as disclosed in Galbraith Patent 2,773,970 the impedance may be such as that over the welding range the volt-ampere characteristic of the unit has a droop of not more than one volt per 50 amperes. This invention in its specific aspect arises from the discovery that the excessive spatter encountered at welding currents below a certain minimum in the prior art practice is caused by the reaction of this constant potential power-supply unit to the fluctuation in the arc produced by the short circuits which arise when globules of metal short circuit the arc. The incidence of such short circuits is negligible at high currents where the metal transfer is of the spray type. At low currents drop transfer occurs and the droplets of comparatively large diameter transferred across the arc have a tendency to produce the high incidence of short circuits. On the occurrence of each short circuit the supply reacts instantaneously transmitting large currents through the arc. The short circuited globule of material is then exploded producing spatter. This condition is accentuated by the fact that the potential of the unit is low, of the order of 10 to 20 volts, and in welding with such a potential the end of the electrode must be maintained near the work.

In accordance with this invention the tendency to explode the globules is suppressed by interposing in series with the electrode and the work reactance sufficient to prevent the rapid build-up of the arc current which causes the explosions. The reactance should not be excessively high. It has been found that excessive reactance militates against the starting of the arc by touching the electrode to the work and in addition results in an unstable (so-called "rubbery") arc which tends to drift or wander over the work.

The apparatus in accordance with this invention includes a power supply unit of the constant-potential direct-current type. Such a unit preferably includes a rectifier which is supplied from a commercial alternating-current supply through transformer means. The direct current terminals of the rectifier are connected to the electrode and the work through the reactance which in the preferred practice of the invention is usually an inductor. The impedance of the transformer means, the rectifier, and the inductor is relatively low and in accordance with a broader aspect of this invention may be as low as practicable. But it has been found that improved operation is achieved with the impedance of the transformer means, the rectifier, and the inductor such that the static volt-ampere characteristic of the apparatus has a droop of 2 to 5 volts per 100 amperes over the welding range. In the usual practice of this invention the drop in the static vole-ampere characteristics of the apparatus should preferably be of the order of three volts. The dynamic characteristic of this supply is determined by the inductor interposed between the direct current terminals and the electrode and work. When welding with this apparatus with low weld currents such that there is a drop transfer it has been found that spatter is greatly reduced.

The above described apparatus has been used in the welding of mild and stainless steel with a consumable electrode in a shield of a mixture of pure argon alone and in shields of pure argon and up to and 5% by volume of pure oxygen. Aluminum may also be welded with this apparatus with a consumable electrode in a shield of pure argon and mild steel in a shield of carbon dioxide. The arc welding current for welding with this apparatus may be low and the penetration is low so that thin-gauge material may be readily welded. Thus mild steel may be welded with a bare electrode (Westinghouse MS–21) of 0.40 inch diameter in a shield of carbon dioxide with a welding current of 70 amperes with very little spatter. Where the welding electrode is of the same material but 1/16 inch in diameter welding current as low as 150 amperes produces satisfactory welding with very little spatter. Plates of a .047 inch diameter have been butt welded with a 1/16 inch diameter electrode in a shield of carbon dioxide without backup, with very little spatter and without burning through the plates. The apparatus may also be used in the welding of aluminum. Fillet welds have been produced between aluminum plates 1/16 inch thick with 3/64 inch aluminum wire in a pure argon shield at 70 amperes welding current with substantially no spatter.

The novel features considered characteristic of this invention are described generally above. The invention itself both as to its organization and as to its method of operation together with additional objects and advantages thereof will be understood from the following description of a specific embodiment taken in connection with the accompanying drawings, in which:

FIG. 3 is a graph showing of the important characteristics of the inductor shown in FIG. 2; and FIG. 4 is a graph presenting data resulting from the making of a number of welds in the practice of this invention and in accordance with the teachings of this prior art.

Figure 1:
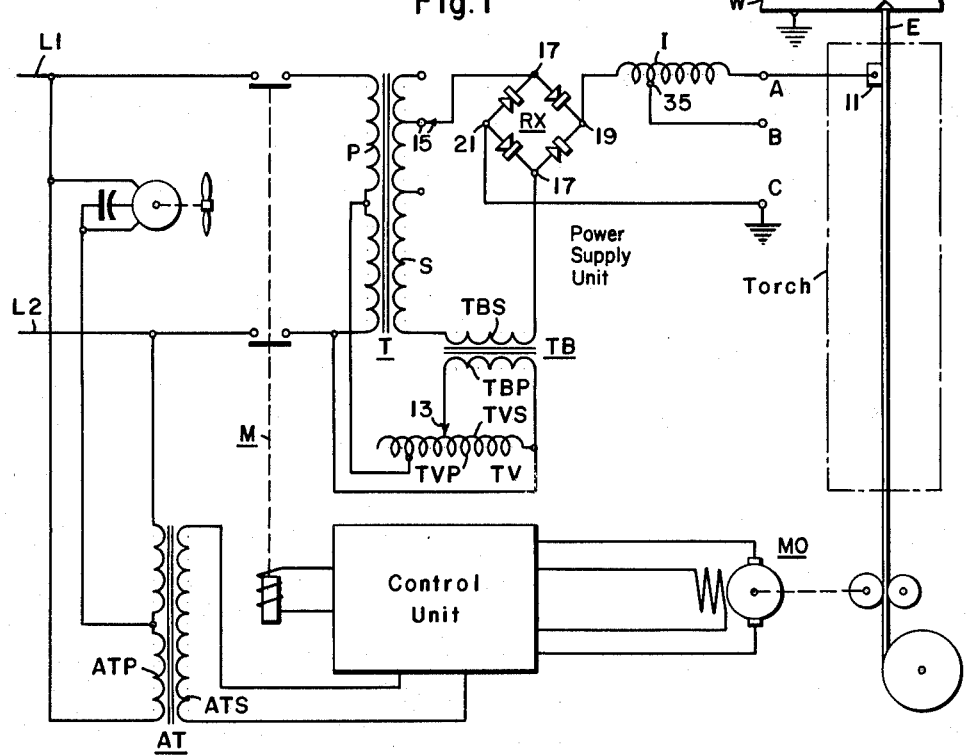
FIGURE 1 is a circuit diagram showing a preferred embodiment of this invention.

The apparatus shown in FIG. 1 includes a Torch, a Control Unit, and a Power Supply Unit. This apparatus is supplied from conductors L1 and L2 which may be connected to the buses of a commercial single-phase alternating current supply, preferably of the 220 or 440 volt type, through the usual disconnects or circuit breakers (not shown).

The Torch may be of any suitable type available in the art and specifically may be of the type shown in Bichsel Patent 2,813,193. Such a Torch includes a channel through which an electrode E is connected to work W. The electrode E is driven through the channel by motor means MO, for example, such as shown in Bichsel et al. 2,823,331. The Torch is provided with a brush or guide 11 for impressing a potential of the electrode E.

The Control Unit may be of any type available in the art. Such, for example, as is shown in Bichsel Patent 2,823,331. It is connected to control the operation of the Power Supply Unit and the supply of electrode E.

The Power Supply Unit is of a novel single-phase type. This Unit includes a main transformer T, a booster transformer TB, and a variable transformer TV. The variable transformer may be a Variac autotransformer.

The main transformer T has a primary P and a secondary S, the booster TB a primary TBP and a secondary TBS. The variable transformer TV has a primary TVP and a secondary TVS, the voltage of which may be set by a movable arm 13. The secondary S is provided with a plurality of taps 15 so that the secondary voltage may be set at selected magnitudes.

The primary P is adapted to be connected between conductors L1 and L2 through front contacts Ma and Mb of a contactor M. The contactor M may be controlled in the manner disclosed in Patent 2,823,331. The primary TVP is connected across all or part of the windings of the primary P and derives its potential from the windings across which it is connected. The primary TBP is connected across the secondary TVS of the variable transformer.

The Power Supply Unit also includes a rectifier RX. This rectifier may be of the single-phase bridge type preferably including silicon elements. Such a rectifier includes alternating-current input terminals 17 and positive and negative output direct-current terminals 19 and 21 respectively. The alternating current terminals are connected in series with the selected portion of the secondary S and the secondary TBS. The Power Supply Unit also includes an inductor I. This inductor I has inductance sufficient to render the apparatus suitable for welding thin-gauge work W particularly of mild and stainless steel and aluminum. The inductor has a tap 35 which permits the reduction of the inductance in situations in which it is desired to weld aluminum with current sufficiently high to produce spray transfer. With higher inductance aluminum may be welded by drop transfer as disclosed herein. The inductor I is connected between the positive terminal 19 of the rectifier RX and the brush 11 through which the potential is impressed on the electrode E. The negative terminal 21 is grounded and is thus connected to the work W which is also grounded.

Figure 2:
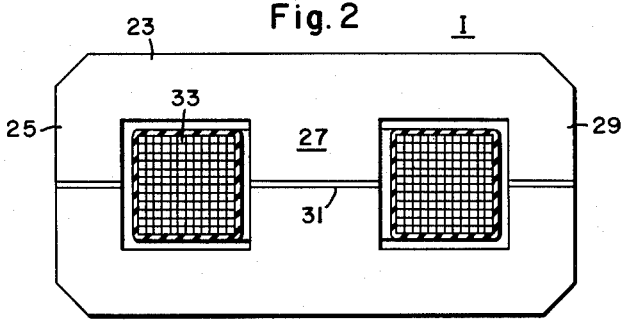
FIG. 2 is a view in section of an inductor used in the practice of this invention.

The important properties of the inductor I are shown in FIG. 2. The inductor has a three-legged laminated core 23, the legs 25, 27 and 29 of which are separated by an air gap which is set by a spacer 31. In actual practice where the Unit of the single-phase direct-current constant potential type is capable of delivering 10 to 40 volts direct current (for an arc voltage of 10 to 20 volts) the gap should preferably have a total width of about 1/8 inch; that is, the spacer 31 is 1/16 inch thick. The iron core area of the center leg 27 should in this case be of the order of 7.55 square inches. The gross core area of the center leg including the space between laminations should preferably be of the order of 7.875 square inches. Each of the outer legs 25 and 29 should have a core area of at least one-half of the core area of the center legs. The coil 33 of the inductor I is composed of low resistance wire and should have 28 turns for the Unit described above when the apparatus is used to weld at a current which produces drop transfer. Tap 35 (FIG. 1) is provided for the satisfactory welding of aluminum at a current which produces spray transfer. With the inductor I connected at the tap 35 only 10 turns are in circuit with the rectifier RX and welding current is supplied to brush 11 from terminal B rather than terminal A.

The magnetic properties of the inductor are shown graphically in FIG. 3 in which flux in kilolines is plotted vertically and current through the coil 33 in amperes is plotted horizontally. The light line at approximately 45° to the current axis is a plot of the flux in the gap 31 as a function of the current. The heavy curve is a plot of the flux of the composite core structure as a function of the current. The current I1 on the curve represents the average welding current in a given situation. The current I2 represents the approximate magnitude of the current for which there is a high incidence of short circuits. It has been found that for proper operation $N\Delta\phi$ should be at least about 4,000 for $$\frac{I2}{I1} = 1.8$$

where N is the number of turns of the coil of the inductor and $\Delta\phi$ is the change in flux in kilolines as the current is changing from I2 to I1. Satisfactory performance was obtained in actual practice with the welding current varied from 60 to 200 amperes with $N\Delta\phi$ ranging from 7550 for 60 amperes to 3880 for 200 amperes. That is, with the average welding current at 60 amperes, the product $N\Delta\phi$ for a change in current between 60 and 108 amperes is about 7550 and the product $N\Delta\phi$ for a change in current between 200 and 360 amperes is about 3880.

With the apparatus disclosed above it is feasible to weld thin-gauge work with the arc current relatively low. FIG. 4 represents data resulting from an actual comparison of prior art welding apparatus with the apparatus in accordance with this invention. In deriving the data presented on this curve welds were carried out with consumable electrodes of mild steel (Westinghouse MS–21) of different diameters as indicated in FIG. 4 in a shield of carbon dioxide. The spatter during the welding was very low and sound welds were produced.

In FIG. 4 the electrode burn-off rate is plotted vertically in inches per minute and the welding current in amperes is plotted horizontally. The curve on the extreme left was derived by welding with an electrode of .035 inch diameter. It is seen that the minimum welding current with prior art apparatus is of the order of 175 amperes but with the apparatus in accordance with this invention the main welding current may be as low as 100 amperes or even less. The corresponding data for an electrode of .040 inch diameter is about 200 amperes for prior-art apparatus and is as low as 75 to 100 amperes for apparatus in accordance with this invention. The reduction in the required welding current for electrodes of a diameter of .0625 inch is similarly marked. For the electrodes of the higher diameter the corresponding data is shown extrapolated.

In the practice of this invention the supply is said to have an output of 10 to 40 volts direct current. The impedance of the transformers TV and TB, the rectifier, and the inductor are such that the Power Supply Unit has a droop in its static volt-ampere characteristic of between 2 and 5 volts per 100 amperes.

The welding is carried out by firing an arc between the electrode E and the work W and feeding the electrode into the arc. The inductor I suppresses the explosion of globules and thus suppresses the spatter. Overhead and vertical welding in a shield of carbon dioxide or argon with mild or stainless steel may be readily carried out. This is an important advantage of this invention and arises from the circumstance that because the current is low the molten pool at the work is of relatively small volume and is held to the work by surface tension.

While a preferred embodiment of this invention has been disclosed herein, it is realized that many modifications thereof are feasible. This invention, then, is not to be restricted except insofar as is necessitated by the spirit of the prior art.

We claim as our invention:

1. Arc welding apparatus for welding work with an electrode comprising conductors for supplying single-phase alternating current, a main transformer having primary and secondary winding means, means connecting said primary winding means to said conductors, a booster transformer having primary and secondary winding means, a variable transformer having primary and secondary winding means, means connecting said primary winding means of said variable transformer to said conductors, means connecting said secondary winding means of said variable transformer to said primary winding means of said booster transformer, rectifier means having input alternating current terminals and output direct current terminals, means connecting in series said secondary means of said main transformer, said secondary means of said booster transformer, and said input terminals, reactance means, and means connected to said reactance means and to said output terminals for connecting in series said output terminals, said reactance means, said electrode and said work.

2. Arc welding apparatus particularly for welding thin-gauge work including said work, a consumable electrode, means for advancing said electrode into arc welding relationship with said work, power-supply means connected to said electrode and work for producing a welding arc between said electrode and said work, means shielding said arc in a protective gas, the current of said arc having a relatively low average magnitude, I1, with a low incidence of short circuiting but having a high average magnitude, I2, on the occurrence of a high incidence of short-circuiting, the said power supply means comprising a direct-current power-supply unit of the low impedance type, said unit having output terminals from which direct current for welding is derivable, and means connected to said terminals for connecting said terminals respectively to said electrode and said work, said connecting means including an inductor, the product of the number of turns of said inductor by the change in flux in kilolines as the arc current varies over a range from I1 to I2, where I2 is equal to about 1.8 I1 being at least of the order of 4000.

3. Arc welding apparatus including work to be welded, an electrode in arc welding relationship with said work, power-supply means connected to said electrode and work for producing a welding arc between said electrode and work, the current of said arc being variable over a predetermined range depending on the properties of the electrode and the work, said range extending at least between about 60 and about 200 amperes, the said supply means comprising the following:

(1) conductors for supplying single-phase alternating current,
(2) a main transformer having primary and secondary winding means,
(3) means connecting said primary winding means to said conductors,
(4) a booster transformer having primary and secondary winding means,
(5) a variable transformer having primary and secondary winding means,
(6) means connecting said primary winding means of said variable transformer to said conductors,
(7) means connecting said secondary winding means of said variable transformer to said primary winding means of said booster transformer,
(8) rectifier means having input alternating current terminals and output direct current terminals,
(9) means connecting in series said secondary means of said main transformer, said secondary means of said booster transformer, and said input terminals, and inductive reactance means, and means connected to said reactance means and to said output terminals for connecting in series said output terminals, said reactance means, said electrode and said work, the combined impedance of said main transformer, said booster transformer, said variable transformer, said rectifier and said reactance means being low so that the droop in the static volt-ampere characteristic over said welding range is approximately between 2 and 5 volts per hundred amperes.

4. Arc welding apparatus particularly for welding thin-gauge work including said work, a consumable electrode, means connected to said electrode for advancing said electrode into arc welding relationship with said work, power-supply means connected between said electrode and work for producing a welding arc between said electrode and work, means for supplying a protective gas to shield said arc, said electrode conducting, and its tip being melted by, the current of said arc, the said power-supply means comprising a direct-current power-supply unit of the low-impedance type, said unit having output terminals from which direct current for welding is derivable and means connected to said terminals for connecting said terminals respectively to said electrode and said work, said connecting means including inductance reactance means, and means connected to said reactance means for selectively setting the reactance of said reactance means at a higher magnitude at which the current-density of the arc current through said electrode is of such low magnitude that the deposit of melted metal from said electrode is of the droplet type, but spatter of metal is suppressed by the reactive action of said inductor, and at a lower magnitude at which the current density of the arc current through said electrode is of such high magnitude that the deposit of melted metal from said electrode is of the spray type.

5. Arc welding apparatus particularly for welding thin-gauge work including said work, a consumable electrode, means for advancing said electrode into arc welding relationship with said work, power-supply means connected to said electrode and work for producing a welding arc between said electrode and said work, means shielding said arc in a protective gas, said electrode conducting, and its tip being melted by, the current from said arc, the said power-supply means comprising a direct-current power-supply unit of the low impedance type, said unit having output terminals from which direct current for welding is derivable, means connected to said terminals for connecting said terminals, respectively to said electrode and said work, said connecting means including an inductor, and means connected to said inductor for selectively setting the inductance of said inductor at a higher magnitude at which the current-density of the arc current through said electrode is of such low magnitude that the deposit of melted metal from said electrode is of the droplet type but spatter of metal is suppressed by the reactive action of said inductor, and at a lower magnitude at which the current-density of the arc current through said electrode is of such high magnitude that the deposit of melted metal from said electrode is of the spray type, the current of said arc having a lower average magnitude, $I1$, when said inductor is set for droplet-type deposit and the incidence of short circuiting of said electrode and work is low and a higher average magnitude, $I2$, when said inductor is set for droplet-type deposit and the incidence of short-circuiting of said electrode and work is high, the product of the number of turns of said inductor by the change in flux in kilolines as the arc current varies from $I1$ to $I2$ where $I2$ is about 1.8 $I1$ being of the order of 4000.

References Cited in the file of this patent

UNITED STATES PATENTS

| | | |
|---|---|---|
| 1,353,711 | Bergman | Sept. 21, 1920 |
| 1,485,744 | Turbayne | Mar. 4, 1924 |
| 2,399,415 | White | Apr. 30, 1946 |
| 2,443,671 | White | June 22, 1948 |
| 2,825,004 | Rebuffoni | Feb. 25, 1958 |
| 2,892,126 | Popa | June 23, 1959 |

FOREIGN PATENTS

| | | |
|---|---|---|
| 282,527 | Great Britain | Dec. 29, 1927 |

OTHER REFERENCES

Hansen: A.I.E.E. Technical Paper 37–142, January 1938.

Westinghouse Mfg. Co. Instruction Leaflet II 26–100–1.

Westinghouse Mfg. Co. Instruction Book IB–5151C.